Sept. 29, 1931. J. G. TANDBERG 1,825,024
GAS MEASURING AND INDICATING DEVICE
Filed June 20, 1928
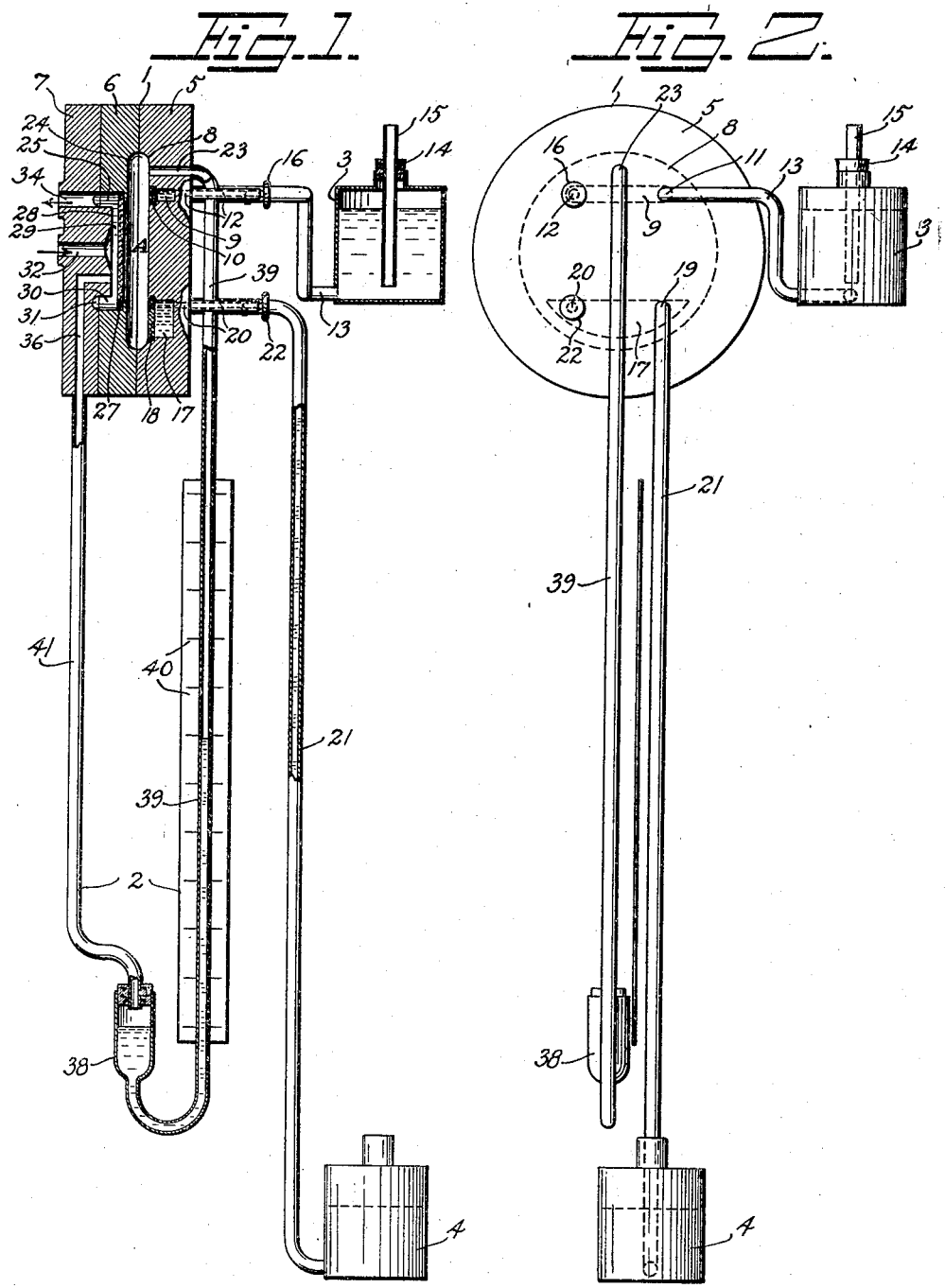

Patented Sept. 29, 1931

1,825,024

UNITED STATES PATENT OFFICE

JOHN GUDBRAND TANDBERG, OF LUND, SWEDEN, ASSIGNOR TO AKTIEBOLAGET CARBA, OF STOCKHOLM, SWEDEN, A CORPORATION OF SWEDEN

GAS MEASURING AND INDICATING DEVICE

Application filed June 20, 1928, Serial No. 286,819, and in Germany June 23, 1927.

My invention relates to the art of measuring and indicating gases or gas contents or the like. The object of the invention is to provide a reliable measuring and indicating apparatus particularly adaptable for certain kinds of work.

More specifically my invention contemplates a method and apparatus for indicating and measuring gas contents and the like wherein gas is diffused through a porous member and absorbed. The absorption material should be of constant absorption capacity and have no lag of absorption. Preferably a liquid is caused to flow continuously through a portion of the chamber into which the diffusion takes place. Also I prefer to use a liquid column in an outlet for said chamber for maintaining a vacuum in the chamber. The pressures of fluid before and after diffusion are imposed on an indicating device which is thus responsive to variations in the difference of pressure.

The invention will be described more in detail with reference to the accompanying drawings showing one form of the invention. On the drawings Fig. 1 shows the principal parts of the apparatus in cross-section; and Fig. 2 is an end view of the apparatus of Fig. 1.

Reference character 1 designates a housing containing the chamber into which the gas diffuses. Reference character 2 designates generally the indicator. Reference character 3 designates a source of absorption liquid or other absorptive fluid. Reference character 4 designates the place of discharge of the absorption liquid enriched with absorbed gas.

The housing 1 shown in Fig. 1 is made up of three plates, disks or sections 5, 6 and 7 which are tightly connected in any desired manner as by screws or bolts with interposed gaskets. Speaking of the parts as shown, the right hand disk 5 is formed with a circular depression 8 on the side which abuts the neighboring middle disk 6. A passageway 9 is formed across the upper part of disk 5 and is separated from depression 8 by a porous member 10. Two relatively small passageways 11 and 12 are cut from the outside of disk 5 to passageway 9. A conduit 13 connects passageway 11 with vessel 3 or other source. Conduit 13 and passageway 9 constitute a supply conduit for absorption liquid to within housing 1, in which supply conduit the porous member 10 is interposed as a restriction. Vessel 3 is provided with a pipe 15 open at top and bottom passing through a stopper 14. The other small passageway 12 is provided with a vent valve 16 for venting air from passageway 9.

The lower part of disk 5 is also made with a passageway or chamber 17 which may be of segment shape as shown and which is separated from depression 8 by a porous member 18. Two smaller passageways 19 and 20 are cut from the outside of disk 5 to space 17. Passageway 19 is connected to a conduit 21 which is filled with absorption liquid. Conduit 21 is connected to discharge vessel 4. Passageway 20 is connected to a vent valve 22. Disk 5 has a passage 23 through it for transmitting pressure to the indicating mechanism.

Middle disk 6 is formed with a depression 24 preferably circular and mating with depression 8 to form a chamber A which might be termed the absorption chamber. As previously indicated, suitable means should be provided to prevent leakage of air between the disks into chamber A which is under vacuum. On the side of disk 6 which is adjacent disk 7, disk 6 is cut out at 25 and a porous member 27 inserted. The cut out part is such that a chamber or passage 29 is formed which is separated from chamber A by porous member 27.

Disk 7 has a projecting portion 28 at the center in which is a central inlet passage 32 for the gas to be tested and around which is an annular space 30 to which is connected a gas outlet 34. Chamber 29 is part of the passage for gas and communicates with space 30, inlet 32 and outlet 34. A circular groove 31 in disk 7 serves as part of space 30. A channel 36 in disk 7 connects passage or space 29 with conduit 41 which is in turn connected to the indicator proper.

The indicator proper consists of closed vessel 38 connected at the top to conduit 41 and at the bottom to conduit 39. The arrangement comprises a V-tube formed of the lower portion of conduit 39 and vessel 38 which is filled with a suitable fluid. Pressure in chamber A is imposed on one leg of the V-tube and the pressure in chamber or passage 29 on the other. Conduit 39 is arranged in front of a graduated indicator panel 40. The drop in pressure of gas passing through porous member 27 can thus be read off the indicator panel and variations in the drop of pressure are indicated. Vessel 38 is preferably of sufficient horizontal cross-section so that the level of liquid in the same varies as little as possible and so that zero adjustments for panel 40 can easily be made. Obviously different kinds of indicators may be used.

Absorption liquid does not fill chamber A. It runs down on the wall thereof which is in disk 5. Conduit 21 is filled with liquid. By means of the liquid column therein a vacuum is created in chamber 17 at least as high or higher than that present in chamber A. This vacuum in chamber 17 is created in order that all absorption liquid supplied to chamber A through porous member 10 is constantly removed therefrom and does not collect at the bottom of this chamber which would disturb the pressure conditions prevailing therein. In order to facilitate and secure this constant removal of all absorption liquid from chamber A a porous member 18 of less restriction than member 10 may be selected. With porous plugs of small porosity and thickness, member 18 would be of larger area than member 10. Of course, they may be of the same size with suitable difference of porosity.

Assuming combustion gases from a furnace to be analyzed on their percentage of carbon dioxide ($CO_2$), the operation of the apparatus will be as follows.

Vessel 3 is filled with hydrate of alkali, for instance, a solution of caustic potash. Before starting the apparatus, chambers 9 and 17 must be filled with liquid. This can be done by lifting vessel 3 so that liquid can flow by gravity into chamber 9 and thence through porous member 10 and chamber A to chamber 17 and from chamber 17 through conduit 21 to vessel 4. When chamber 9 is filled, vessel 3 may be placed as shown on the drawings. During operation, liquid will be continuously sucked from vessel 3 into chamber A. In chamber A the liquid flows as a thin film along the surface of depression 8 and to and through porous member 18.

The gases to be analyzed are introduced into the apparatus through opening 32 and fill chamber 29. The gases leave again through conduit 34. The air contained in chamber A now tends to diffuse through porous member 27 into chamber 29 and carbon dioxide tends to diffuse through porous member 27 from chamber 29 into chamber A. However, since carbon dioxide diffuses more slowly than air, a vacuum is quickly produced in chamber A. The amount of vacuum produced depends on the amount of carbon dioxide diffusing per unit of time through porous member 27, and absorbed in the liquid of constant absorption capacity flowing through chamber A. The vacuum is thus a measure of the percentage of carbon dioxide present in the gas flowing through chamber 29. The rate of diffusion of this gas through member 27 depends upon the partial pressure of the carbon dioxide in chamber 29. The percentage of carbon dioxide in the gas can thus be measured on the scale 40.

Valves 16 and 22 also serve as openings for cleaning the apparatus if it is used for measuring different gases and different kinds of absorption liquids are used therefor.

It is preferable to use as little absorption liquid as possible. With a slower flow the rate of flow can be more readily controlled. As above pointed out the absorptive rate should be constant. This is best obtained by using a fluid of constant absorptive capacity in a uniform flowing stream.

Various kinds of diffusion substances may be used such as glass, so-called Jena-Glass, graphite, carbon, clay and compositions of various kinds. Water may be used as an absorption liquid. The kind of absorption liquid will obviously depend on the gases being tested.

It will be obvious that various forms of structure may be used in carrying out my invention.

What I claim is:

1. Apparatus for measuring gas content and the like comprising a housing, a chamber formed within said housing, said housing having a passage for gas, a porous member arranged between said passage and said chamber and means for flowing a continuous stream of absorption liquid through said chamber.

2. Apparatus for measuring gas content and the like comprising a housing, a chamber formed within said housing, said housing having a passage for gas, a porous member arranged between said passage and said chamber and means for continuously moving absorption material having a given absorption capacity through said chamber to maintain a constant absorption rate in said chamber.

3. Apparatus for measuring gas content and the like comprising a housing, a chamber formed within said housing, said housing having a passage for gas, a porous member arranged between said passage and said chamber, a source of supply of absorption fluid, a supply conduit between said source and said chamber, a restriction interposed in said supply conduit, an outlet conduit for conducting fluid from said chamber and a restriction in said outlet conduit.

4. Apparatus for measuring gas content and the like comprising a housing, a chamber formed within said housing, said housing having a passage for gas, a porous member arranged between said passage and said chamber, a source of supply of absorption liquid, a supply conduit between said source and said chamber, a porous member in said supply conduit, an outlet conduit for conducting liquid from said chamber and a porous member in said outlet conduit, the porous member in the outlet conduit permitting greater flow of liquid therethrough than the porous member in the supply conduit.

5. Apparatus for measuring gas content and the like comprising a housing, a chamber formed within said housing, said housing having a passage for gas, a porous member arranged between said passage and said chamber, a source of supply of absorption liquid, a supply conduit between said source and said chamber, a porous member in said supply conduit, an outlet conduit for conducting liquid from said chamber, a porous member in said outlet conduit, the porous member in the outlet conduit permitting greater flow of liquid there through than the porous member in the supply conduit, an indicator and means connecting the indicator with the passage and the chamber, the indicator being responsive to the difference of pressure between said passage and said chamber.

6. Apparatus for measuring gas content and the like comprising a housing, a chamber formed within said housing, said housing having a passage for gas, a porous member arranged between said passage and said chamber, said chamber having a wall confronting said porous member, and means for flowing a continuous film of absorption liquid over the surface of said wall.

7. Apparatus for measuring gas content and the like comprising a housing, a chamber formed within said housing, said housing having a passage for gas, a porous member arranged between said passage and said chamber, and means for maintaining a vacuum in said chamber and flowing a continuous stream of absorption liquid through said chamber.

8. Apparatus for measuring gas content and the like comprising a housing, a chamber formed within said housing, said housing having a passage for gas, a porous member arranged between said passage and said chamber, a source of supply of absorption liquid, a supply conduit between said source and said chamber and an outlet conduit for conducting liquid from said chamber, said outlet conduit being arranged to produce a vacuum in said chamber.

9. Apparatus for measuring gas content and the like comprising a housing, a chamber formed within said housing, said housing having a passage for gas, a porous member arranged between said passage and said chamber, a source of supply of absorption liquid, a supply conduit between said source and said chamber, a restriction in said supply conduit, an outlet conduit for conducting liquid from said chamber and restriction in said outlet conduit, said outlet conduit being arranged to produce a vacuum in said chamber.

10. Apparatus for measuring gas content and the like comprising a housing, a chamber formed within said housing, said housing having a passage for gas in communication with said chamber, a porous member arranged between said passage and said chamber, means for flowing a continuous stream of absorption liquid through said chamber, an indicator and means connecting the indicator with the passage and the chamber, the indicator being responsive to the difference of pressure between said passage and said chamber.

11. Apparatus for measuring gas content and the like comprising a housing, a chamber formed within said housing, said housing having a passage for gas in communication with said chamber, a porous member arranged between said passage and said chamber, a source of supply of absorption liquid, a supply conduit between said source and said chamber, a restriction interposed in said supply conduit, an outlet conduit for conducting liquid from said chamber, a restriction in said outlet conduit, an indicator and means connecting the indicator with the passage and the chamber, the indicator being responsive to the difference of pressure between said passage and said chamber.

12. Apparatus for measuring gas content and the like comprising a housing, a chamber formed within said housing, said housing having a passage for gas in communication with said chamber, a porous member arranged between said passage and said chamber, means for continuously moving absorption material having constant absorption capacity through said chamber, an indicator, and means connecting the indicator with the passage and the chamber, the indicator being responsive to the difference of pressure between said passage and said chamber.

13. The method of measuring the amount of a gas constituent in a gas mixture which comprises diffusing the gas constituent through a porous member into the presence of a continuously moving absorption agency and measuring variations in the difference of gas pressure on the opposite sides of the porous member.

14. The method of measuring the amount of a gas constituent in a gas mixture which comprises diffusing the gas constituent through a porous member, continuously flowing absorption liquid into the presence of the diffused gas and measuring variations in the difference of gas pressure on the opposite sides of the porous member.

15. The method of measuring the carbon dioxide content of flue gases which comprises passing the flue gases to one side of a porous member, passing absorption liquid capable of absorbing the carbon dioxide but not other constituents of the flue gases past the other side of the porous member but spaced therefrom and measuring the difference of pressure on the two sides of the porous member.

16. That improvement in the art of measuring the carbon dioxide content of flue gases by the aid of a device having a passage and a chamber separated by a porous member, which consists in passing flue gases through said passage, passing absorption liquid capable of absorbing carbon dioxide but not other constituents of the flue gases through said chamber, and measuring the difference between the pressures of gases in the passage and the chamber caused by the diffusion through the porous member of carbon dioxide and its absorption by the absorption liquid.

17. That improvement in the art of measuring the carbon dioxide content of flue gases by the aid of a device having closed chambers separated by a porous member which consists in passing the flue gases through one of said chambers, passing a solution of caustic potash through the other of said chambers and measuring the difference between the pressures of gases in the chambers caused by the diffusion through the porous member of carbon dioxide and its absorption by the caustic potash solution.

In testimony whereof I have affixed my signature.

JOHN GUDBRAND TANDBERG.